US007572998B2

(12) United States Patent
Mohamed et al.

(10) Patent No.: US 7,572,998 B2
(45) Date of Patent: Aug. 11, 2009

(54) METHOD AND DEVICE FOR CREATING A MICRO PLASMA JET

(76) Inventors: Abdel-Aleam H. Mohamed, 858 W. 42nd St., Norfolk, VA (US) 23508; Juergen Friedrich Kolb, 1535 Johnstons Rd., Apt. 103, Norfolk, VA (US) 23518; Karl H. Schoenbach, 305 Brooke Ave., Apt. 308, Norfolk, VA (US) 23510

( * ) Notice: Subject to any disclaimer, the term of this patent is extended or adjusted under 35 U.S.C. 154(b) by 624 days.

(21) Appl. No.: 11/141,723

(22) Filed: May 31, 2005

(65) Prior Publication Data

US 2006/0028145 A1 Feb. 9, 2006

Related U.S. Application Data

(60) Provisional application No. 60/575,146, filed on May 28, 2004.

(51) Int. Cl.
*B23K 10/00* (2006.01)

(52) U.S. Cl. .............................. 219/121.5; 219/121.52; 219/121.48; 313/631; 315/111.21

(58) Field of Classification Search ............. 219/121.5, 219/121.52, 121.51, 121.48, 119, 74, 75, 219/121.4; 315/111.21, 111.41, 169.3, 169.4; 313/231.31, 231.41, 631, 306
See application file for complete search history.

(56) References Cited

U.S. PATENT DOCUMENTS

| | | | |
|---|---|---|---|
| 3,772,188 | A | 11/1973 | Edwards |
| 4,053,814 | A | 10/1977 | Regan et al. |
| 4,088,926 | A | 5/1978 | Fletcher et al. |
| 4,348,357 | A | 9/1982 | Bithell |
| 4,551,609 | A | 11/1985 | Falk |
| 4,801,427 | A | 1/1989 | Jacob |
| 4,957,606 | A | 9/1990 | Juvan |
| 5,003,225 | A | 3/1991 | Dandl |
| 5,026,484 | A | 6/1991 | Juvan |
| 5,147,493 | A | 9/1992 | Nishimura |
| 5,198,724 | A | 3/1993 | Koinuma et al. |
| 5,272,414 | A | 12/1993 | Iwanaga |
| 5,272,417 | A | 12/1993 | Ohmi |
| 5,285,046 | A | 2/1994 | Hansz |
| 5,289,085 | A | 2/1994 | Godyak et al. |
| 5,309,063 | A | 5/1994 | Singh |
| 5,369,336 | A | 11/1994 | Koinuma et al. |
| 5,387,842 | A | 2/1995 | Roth et al. |
| 5,403,453 | A | 4/1995 | Roth et al. |

(Continued)

FOREIGN PATENT DOCUMENTS

| | | |
|---|---|---|
| WO | WO2006096715 | 9/2006 |

*Primary Examiner*—Mark H Paschall
(74) *Attorney, Agent, or Firm*—Williams Mullen; M. Bruce Harper

(57) ABSTRACT

A microhollow cathode discharge assembly capable of generating a low temperature, atmospheric pressure plasma micro jet is disclosed. The microhollow assembly has at two electrodes: an anode and a cathode separated by a dielectric. A microhollow gas passage is disposed through the three layers, preferably in a taper such that the area at the anode is larger than the area at the cathode. When a potential is placed across the electrodes and a gas is directed through the gas passage into the anode and out the cathode, along the tapered direction, then a low temperature micro plasma jet can be created at atmospheric pressure.

3 Claims, 6 Drawing Sheets

U.S. PATENT DOCUMENTS

| | | | |
|---|---|---|---|
| 5,414,324 A | 5/1995 | Roth et al. | |
| 5,456,972 A | 10/1995 | Roth | |
| 5,569,810 A | 10/1996 | Tsuji | |
| 5,680,014 A | 10/1997 | Miyamoto et al. | |
| 5,707,594 A | 1/1998 | Austin | |
| 5,876,663 A | 3/1999 | Laroussi | |
| 5,883,470 A | 3/1999 | Hatakeyama et al. | |
| 6,005,349 A | 12/1999 | Kunhardt et al. | |
| 6,072,273 A | 6/2000 | Schoenbach et al. | |
| 6,087,774 A | 7/2000 | Nakayama et al. | |
| 6,177,763 B1 | 1/2001 | Morrow | |
| 6,194,833 B1 | 2/2001 | De Temple et al. | |
| 6,204,605 B1 | 3/2001 | Laroussi et al. | |
| 6,262,523 B1 | 7/2001 | Selwyn et al. | |
| 6,433,480 B1 * | 8/2002 | Stark et al. | 313/631 |
| 6,858,988 B1 | 2/2005 | Laroussi | |
| 2006/0082319 A1 * | 4/2006 | Eden et al. | 315/169.3 |
| 2007/0017636 A1 * | 1/2007 | Goto et al. | 156/345.47 |
| 2007/0108910 A1 * | 5/2007 | Eden et al. | 313/631 |

* cited by examiner

METHOD AND DEVICE FOR CREATING A MICRO PLASMA JET

CROSS-REFERENCE TO RELATED APPLICATION

The present application claims priority from U.S. Provisional Application Ser. No. 60/575,146, filed May 28, 2004.

STATEMENT REGARDING GOVERNMENT SUPPORT

This invention was made in part with government support under Grant No. AFOSR F49620-00-1-0079 awarded May 1, 2000 by the Air Force Office of Scientific Research. The government has certain rights in this invention.

BACKGROUND OF THE INVENTION

1. Field of the Invention

The present invention relates generally to the field of plasma devices and their uses. More particularly, this invention relates to the creation and use of a microhollow cathode plasma jet discharge.

2. Description of the Related Art

Plasma is an electrically neutral, ionized state of gas, which is composed of ions, free electrons, and neutral species. As opposed to normal gases, with plasma some or all of the electrons in the outer atomic orbits have been separated from the atom, producing ions and electrons that are no longer be bound to one other. Typically, ultraviolet radiation or electrical fields can be used to create plasma by accelerating (or heating) the electrons and ionizing the gas. With separated electrons, plasmas will interact or couple readily with electric and magnetic fields. Practical applications of plasmas may include plasma processing, plasma displays, surface treatments, lighting, deposition, ion doping, etc.

When the ions and electrons of a plasma are the same temperature, then the plasma is considered to be in thermal equilibrium (or a "thermal plasma.") That is, the ions and free electrons are at a similar temperature or kinetic energy. For example, a typical thermal plasma torch used for atmospheric pressure plasma spraying may easily provide a plasma flow with temperatures between 9,000 and 13,000 K.

Non-thermal plasmas are plasmas where the electrons may be in a high state of kinetic energy or temperature, while the remaining gaseous species are at a low kinetic energy or temperature. The typical pressure for generating a non-thermal or low temperature plasma glow discharge is approximately 100 Pa. Devices that attempt to generate discharges at higher or atmospheric pressures face problems with heating and arcing within the gas and/or the electrode, sometimes leading to problems with electrode wear. To counteract these effects, the linear dimension of the device may be reduced to reduce residence time of the gas in the electric field or a dielectric barrier may be inserted to separate electrodes. However, these adjustments can affect scalability and power consumption. Other cases may employ gasses intended to inhibit arcing or ionization. The field has produced few low power, atmospheric, non-thermal plasma jet capable of operating at room or near room temperature.

Some researchers have investigated the generation of non-thermal plasma discharges at atmospheric pressures. For example, a micro beam plasma generator has been described by Koinuma et al. Hideomi Koinuma et al., "Development and Application of a Microbeam Plasma Generator," Appl. Phys. Lett. 60(7), (Feb. 17, 1992). This generator produced a micro beam plasma discharge using radio frequency (RF) and ionization of a gas that flowed between two closely spaced concentric electrodes separated by a quartz tube as a dielectric. The plasma discharge temperature was 200-400C.

Stoffels et al. has disclosed a non-thermal plasma source titled a "plasma needle." E. Stoffels et al., "Plasma Needle: a non-destructive atmospheric plasma source for fine surface treatment of (bio)materials," Plasma Sources Sci. Technol. 11 (2002) 383-388. The plasma needle also used an RF discharge from a metal needle; an RF electrode is mounted axially within a gas filled, grounded cylinder to generate plasma at atmospheric pressure. Plasma appeared at the tip of the needle and its corona discharge was collected by a lens and optical fiber.

Stonies et al. recently disclosed a small microwave plasma torch based on a coaxial plasma source for atmospheric pressures. Robert Stonies et al., "A new small microwave plasma torch," Plasma Sources Sci. Technol. 13 (2004) 604-611. This torch generated a microwave induced plasma jet induced by microwaves at 2.45 GHz. Some of the features of this torch were relatively low power consumption (e.g., 20-200 W) compared to other plasma sources and its small size. However, the excitation temperature for this small plasma generator was about 4700K.

In general, micro beam generators are often limited in size by a requirement that the concentric or coaxial dielectric be limited in thickness for proper plasma generation. High pressure or atmospheric glow discharges in parallel plane electrode geometries may be prone to instabilities, particularly glow to arc transitions, and have generally been believed to be maintainable only for periods in the order of ten nanoseconds. Further, the above high pressure devices require RF or microwave signals, which can complicate practical implementation.

U.S. Pat. No. 6,262,523 to Selwyn et al. disclosed an atmospheric plasma jet with an effluent temperature no greater than 250C. This approach used planar electrodes configured such that a central flat electrode (or linear collection of rods) was sandwiched between two flat outer electrodes; gas was flowed along the plane between the electrodes while dielectric material held the electrodes in place. An RF source supplied the central electrode, which consumed 250 to 1500 W at 13.56 MHz, for an output temperature of near 100C and a flow rate of about 25-52 slpm. One function of the high flow rate is to cool the center electrode in an attempt to avoid localized emissions. This device requires Helium to limit arcing; Helium has a low Townsend coefficient so that electric discharges in Helium carry high impedance. The embodiment that employs a linear collection of rods seeks to limit arcing by creating secondary ionization within the slots between the rods, forming a form of hollow cathode effect. Although an improvement, this device requires a high flow rate of helium, along with a significant RF power input to achieve an atmospheric plasma jet near 100C.

SUMMARY OF THE INVENTION

The present invention is a novel device and method to generate a micro plasma jet at atmospheric pressure using microhollow cathode discharges (MHCDs). This device is capable of generating non-thermal plasma near 30C. When operated with rare gases or rare gas-halide mixtures, the MHCDs can emit a highly efficient excimer radiation. With a plurality of such jets at atmospheric pressure, the present invention may be used as for generating stable and large volume, plasmas. Further, such MHCDs are controllable for temperature and other performance parameters, as described further herein.

MHCDs are high-pressure gas discharges in which the hollow cathode is formed by a microhollow structure, as described in U.S. Pat. No. 6,433,480 to Stark et al., which is hereby incorporated by reference. Hollow cathode discharges are very stable, in part due to a "virtual anode" that is created across the hollow. This virtual anode inhibits local increases in electron density by a corresponding reduction in voltage, reducing the likelihood of arcing. Further, the present invention may be operated with a direct current (DC) voltage on the order of hundreds of volts (up to approximately 1000V), which renders its operation simpler than devices relying on RF or microwave signals.

The present invention employs a microhollow cathode discharge assembly, preferably having at least three layers: two closely spaced but separated electrodes (e.g., a planar anode and a planar cathode separated by a planar dielectric.) A gas passage that also serves as a microhollow is disposed through the three layers. When a potential is placed across the electrodes and a gas flow is applied to the anode inlet to the gas passage then a low temperature micro plasma jet can be created at relatively high or atmospheric pressure. A wide variety of gases may be used, with the data herein generated by use of air, oxygen, and nitrogen. Preferably, the configuration of the microhollow gas passage will be tailored to the application. A variety of microhollow structures may be employed, so long as they support an acceptable hollow cathode discharge while accommodating the flow of gas. At atmospheric pressure, the discharge geometry should be sufficiently small (e.g., several hundred μm to a few mm) to generate a stable glow discharge. An increase in size may require a reduction in pressure in order to produce a stable discharge.

The present invention may be useful in any plasma application, but is specially useful for heat sensitive applications such as surface treatment, sterilization, decontamination, deodorization, decomposition, detoxification, deposition, etching, ozone generation, etc.

DESCRIPTION OF THE DRAWINGS

FIG. 5 is a graph of gas flow rate and gas jet temperature measured end on.

DETAILED DESCRIPTION OF THE PREFERRED EMBODIMENT

The following detailed description is an example of an embodiment in the best presently contemplated modes of carrying out the invention. This description is not to be taken in a limiting sense, but is made merely for the purpose of illustrating general principles of embodiments of the invention.

The present invention is an apparatus for the creation of an atmospheric pressure, low temperature plasma micro jet. In addition, radical species of the present invention may be controlled or tuned for specific applications. By operation with different gases, the device is a simple plasma-reactor producing particular radicals, such as ozone, OH, or other reaction products, depending on the desired gas.

The micro jet of the present invention is based on inducing a glow discharge in an axial and lateral direction while flowing air or other gases through a microhollow gas passage subject to an electric field. The jet may be operated in parallel with similar such jets for scalability to larger volume applications. As described further herein, the discharge gas temperature may be controlled as a function of gas flow rate through the microhollow structure, the applied potential across the electrodes, and the structure of the microhollow assembly. A variety of microhollow structures or geometries may be employed, so long as they support an acceptable hollow cathode discharge while accommodating the flow of gas; the discharge geometry should be sufficiently small (e.g., sub-millimeter) to generate a stable glow discharge. The below detailed description refers to an illustrative embodiments having a circular hole with a diameters of 0.15-0.45 mm at the anode and 0.07-0.3 mm at the cathode, which produced a stable discharge. Other geometries for microhollow gas passages may include shaped hollows, slits, curvilinear voids, etc. Optionally, for improved gas flow characteristics, the gas passage may be tapered (as illustrated herein) such that the diameter at the cathode may be smaller than that at the anode. This can provide a beneficial nozzle effect; however, embodiments having an un-tapered gas passage will also function satisfactorily depending on the application. A wide variety of gases may be used.

Figure 1:
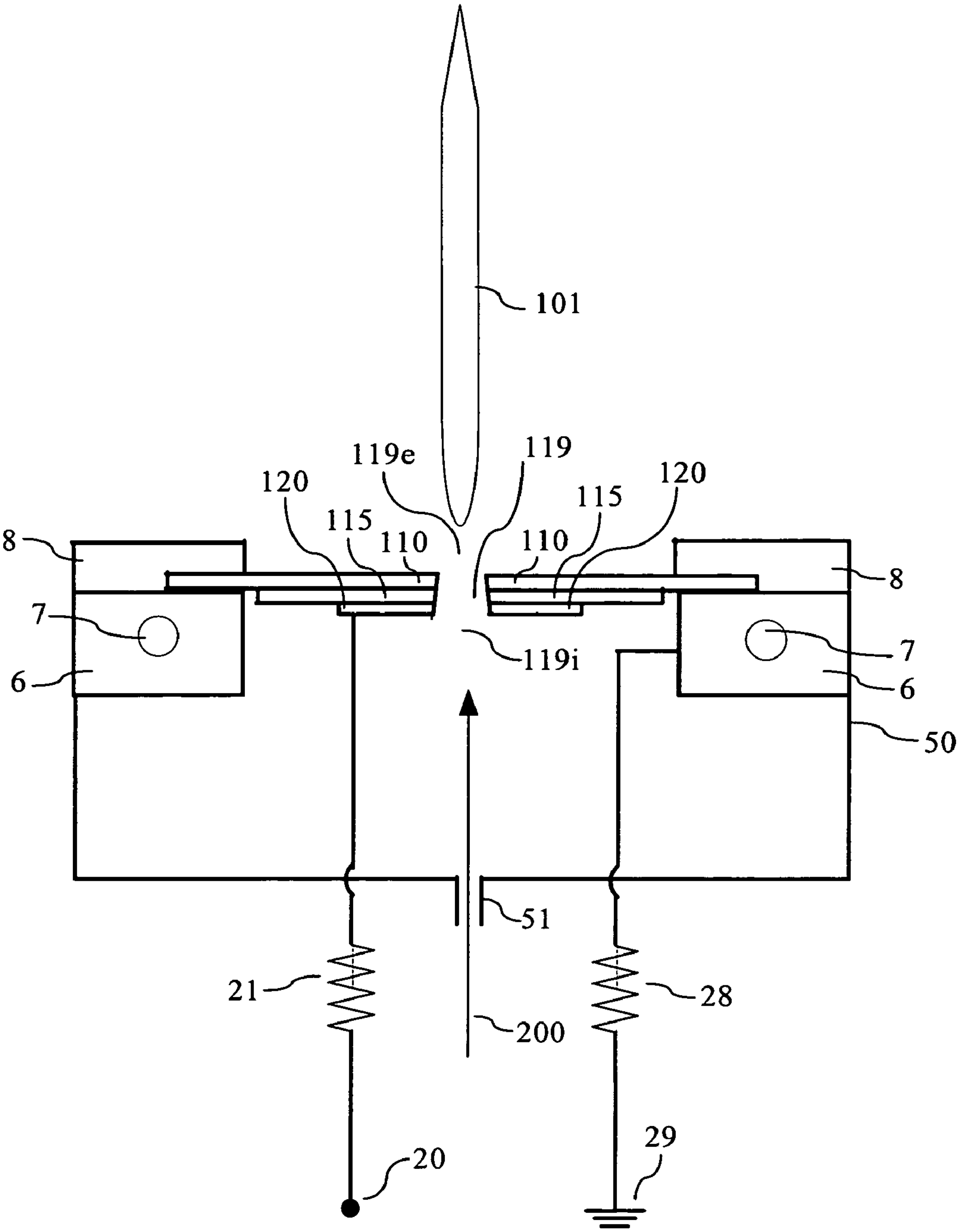
FIG. 1 shows a cross sectional view of the physical structure of an embodiment of the present invention including a supply circuit and gas chamber.
Figure 2:
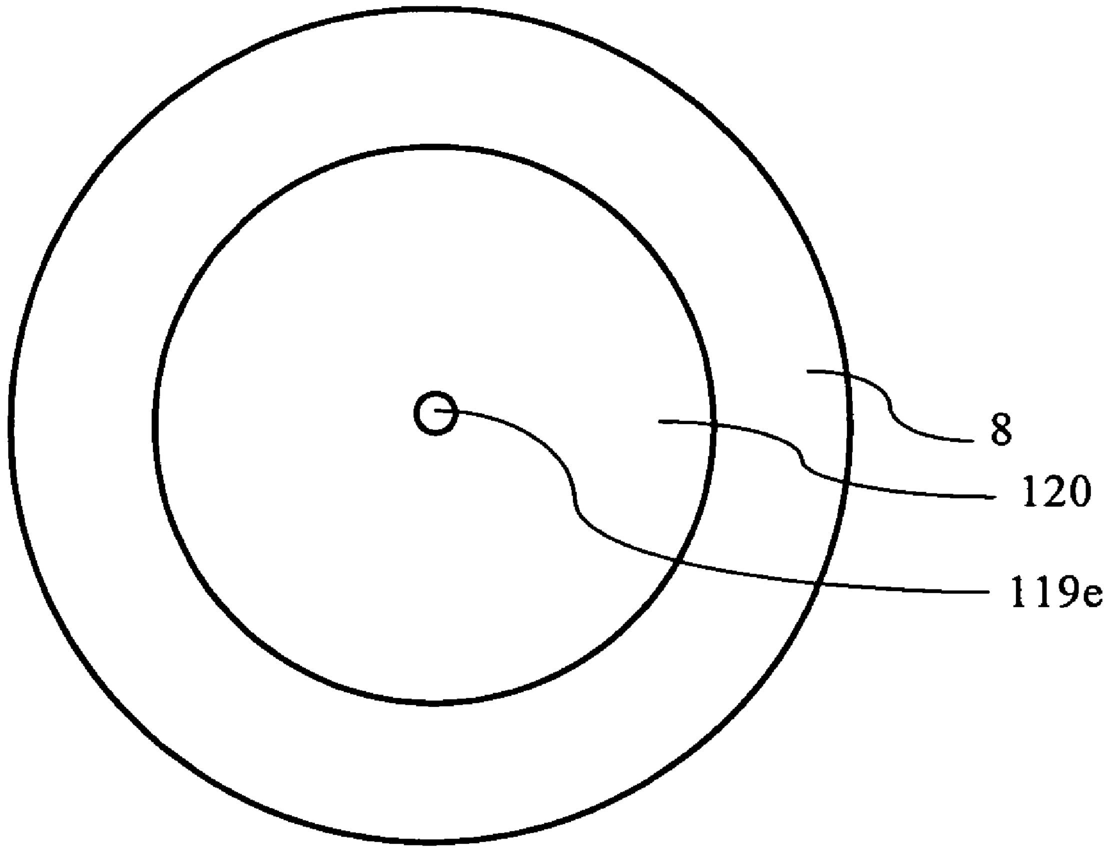
FIG. 2 illustrates a top view of a circular embodiment of the present invention.
Figure 3:
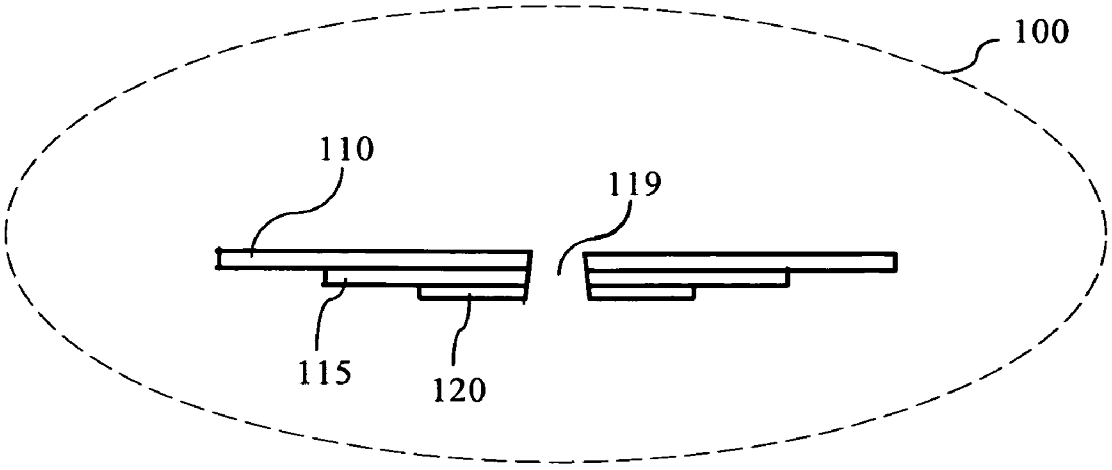
FIG. 3 shows the planar microhollow assembly layers with the microhollow gas passage.

As shown in the cross sectional view of FIG. 1, a plasma jet 101 may be produced using the present invention, preferably using a direct current potential applied to plane-parallel first electrode 110 and plane parallel second electrode 120 separated from each other. FIG. 2 shows a top view of an example of present invention with second electrode 120, retaining ring 8, and microhollow gas passage exhaust 119*e*, in some embodiments also referred to as a borehole. FIG. 3 is an illustration of the components of planar microhollow assembly 100. Electrodes 110 and 120 may be fabricated from 0.25 mm thick sheets of molybdenum, although other materials and thicknesses will work as well depending on the specific application. The electrode material and thickness need be able to sustain temperatures in the range of 1000-1400C. Sheet dielectric 115, in this example made of 0.25 mm thick alumina, acts as an insulator between first and second electrodes 110 and 120. Microhollow gas passage 119 in this embodiment is a tapered channel that provides communication of gas across through an electric field formed when a potential is placed across first and second electrodes 110 and 120. The flow of gas is typically from a nozzle or chamber 5 (not shown) to the atmosphere, past the three layers of the first electrode 110, dielectric 115, and second electrode 120. In this example, the gas passage ranged from 0.15 to 0.45 mm diameter in second electrode 120 and 0.08 to 0.3 mm in first electrode 110. However, as noted above, the passage need not be tapered and the dimensions are limited only by the requirement to produce a stable gas discharge under the conditions of application. With reference to FIG. 1, retaining ring 8, by threads or other fastening means known in the art, mounts onto conductive bulk 6, to fix or retain microhollow assembly 100 in place. First and second electrodes 110 and 120 are juxtaposed adjacent and parallel to sheet dielectric 11. For this example, electrode 20 is in conductive contact with conductive bulk 6. Chamber 5 may be nonconductive, insulated from conductive bulk 6 by acrylic or other means, or incorporated into an electrical circuit, as is known to those in the art. Optional coolant channel 7 or other heat sink is provided to withdraw excessive heat.

A positive direct current power supply 20 may preferably be conductively connected to second electrode 120 via current limiting resistor 21. First electrode 110 is electrically connected to conductive bulk 6, which in turn connects to ground 29 by way of current view resistor 28. Other means of creating a potential between electrodes 110 and 120 may be used, including alternative circuit configurations or arrangements employing other currents forms. In general, first electrode 110, or the outer electrode, is grounded to form a cathode, with second sheet electrode 120, or the inner electrode being an anode. A desired breakdown voltage will be a function in part of the electrode distance and the pressure of application; the voltage may be varied within a limited range depending on the desired gas flow rate and current.

As demonstrated by arrow 200, a gas may be admitted into or blown through chamber inlet hole 51 of chamber 50. The gas enters microhollow gas passage 119 by microhollow gas passage inlet 119*i*. In some embodiments, chamber 50 may contain gas at a pressure. The present invention may employ a wide variety of gases, depending on the application. As gas is admitted axially at the bottom of chamber 50, whether by pressure or by stream, a well defined micro plasma jet 101 expands into the surrounding ambient environment. In this example, such a plasma micro jet may have a diameter on the order of 1 mm; the jet may be elongated as a function of gas flow rate and microhollow dimensions. Additionally, as gas flow rate increases the flow will eventually cross from laminar to turbulent flow, changing the jet characteristics.

Figure 4:
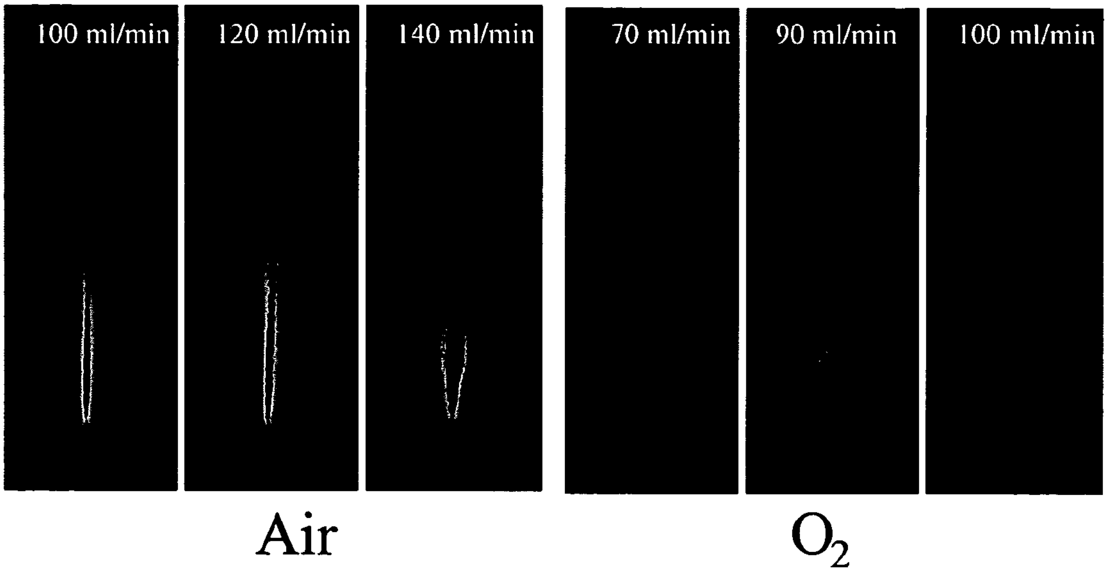
FIG. 4 includes photographs of the plasma micro jet.
Figure 5:
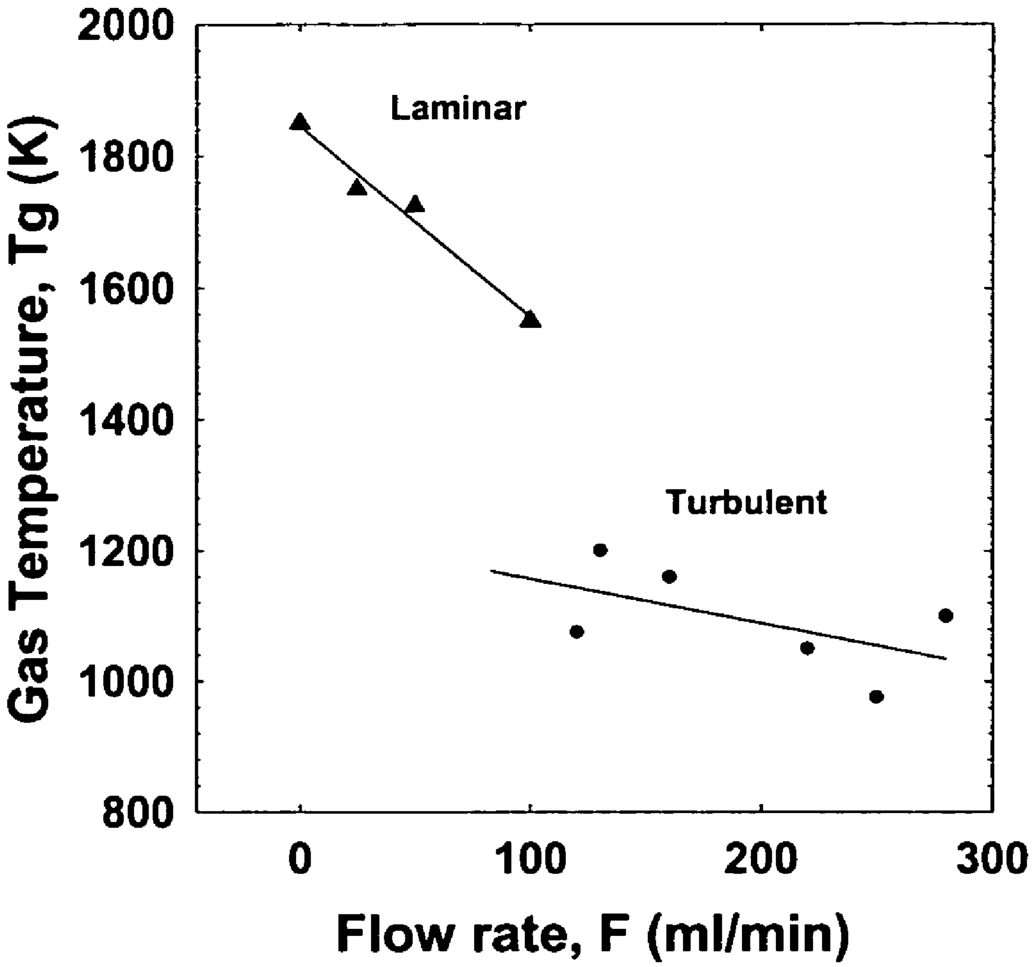

FIG. 4 shows photographs of the visible light emissions of a micro plasma jet created by the present invention using air or oxygen at the flow rates indicated therein. These illustrate the transition from laminar to turbulent flow at 140 ml/min for air and 100 ml/min for $O_2$. As may be seen in FIG. 5, the discharge temperature (taken end-on) decreased with an increase in gas flow rate, and dropped noticeably (e.g., approximately 350 K in this example) with the transition from laminar to turbulent flow.

Figure 6:
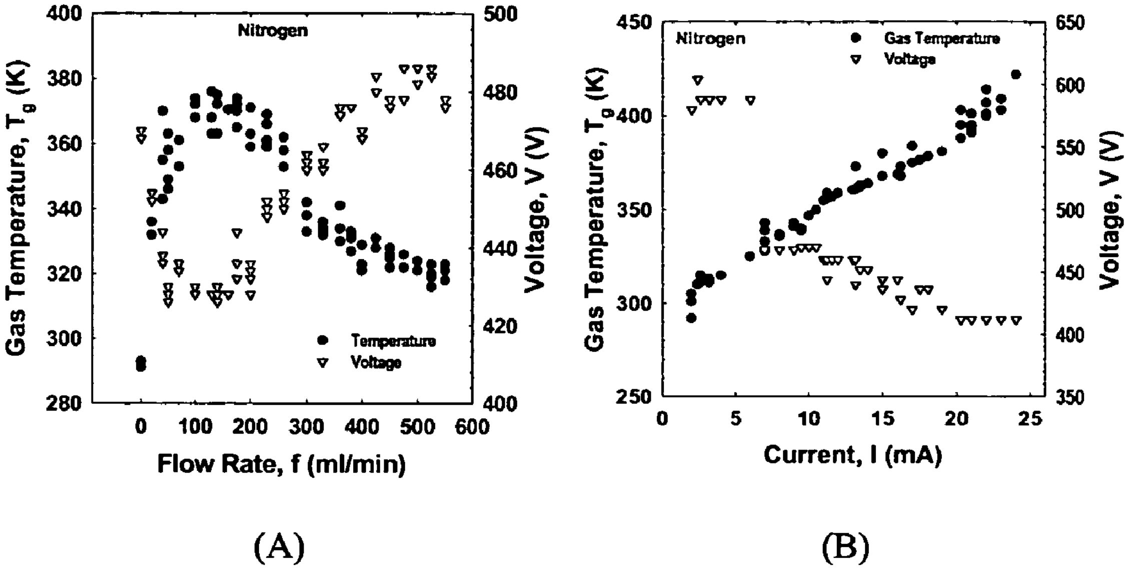
FIG. 6 illustrates the relationship among gas flow rate, temperature, and applied voltage. In these graphs, temperature is measured side-on at 1.65 mm from anode surface.

FIG. 6A is a chart of the temperature and voltage of the discharge jet taken from the side, 1.65 mm from the anode surface, as a function of nitrogen flow rate with 7 mA current applied. Again, these results are provided for this exemplary embodiment and may change with dimensional adjustments. The temperature initially increased as a result of increasing gas flow rate until a peak value at 140 ml/min. As the flow rate increased beyond 140 ml/min, the gas temperature then decreased. The discharge voltage demonstrated an opposite trend related to the transition from laminar to turbulent flow. Initially, as the flow rate was increased, the flow demonstrated steady laminar characteristics. As the flow approached the critical Reynolds number, $R_c$, it became unsteady. An increase in flow rate led to bursts of turbulent flow and the formation of eddies; the mixing caused by eddy currents absorbed energy and decreased the gas and plasma temperature. The increase in discharge voltage also shown in FIG. 6A resulted from an increase in the attachment of electrons to oxygen molecules as gas temperature decreased.

The gas flow rate is also relevant in that it affects the time the gas spends within the electric field. For the present embodiment, the microhollow diameter was approximately 100 μm for electrode 110 and 200 μm for electrode 120. The initial discharge current was 10 mA. The decrease in gas temperature was related in part to the decrease in residence time ($t_r$) for the gas within the microhollow or gas passage 119 while under the applied electric field. The gas flow rate (f) through gas passage 119 relates to the residence time as a function of the volume of the microhollow. For the embodiment in FIG. 5, the microhollow cross sectional area was $17.67\times10^{-3}$ $mm^2$, with a sample thickness of 1 mm, producing a volume constant (c) of approximately 0.0177 $mm^3$. The residence time may be calculated as follows:

$$t_r=c/f$$

Thus, at a flow rate of 20 ml/min the residence time is 53 μsec, while a flow rate of 200 ml/min produces a residence time of 5.3 μsec.

In another example, the gas discharge temperature increased linearly with discharge current for a constant nitrogen flow rate, as shown in FIG. 6B. At 1.65 mm from the surface of electrode 110, the micro plasma jet was at room temperature or 300 K, for 3 mA current and at 475 K for 22 mA; both cases taken at a flow rate of 300 ml/min of nitrogen. As may be expected, the results with air were similar. The voltage—current characteristics are shown for current ranging from 2-24 mA. For a discharge current from 2-6 mA, the discharge voltage was nearly constant at 585 V. Above 6 mA, a Townsend form of transition to a negative glow discharge dropped voltage to 465 V. From 7-20 mA, the discharge voltage decreased from 465 to 420 V, in an apparently normal glow discharge reaction. Above 20 mA, the voltage was constant at 412 V. As shown, an increase of current at a constant flow rate will produced a linear increase in gas temperature.

When gas flows into the inlet of microhollow gas passage 119*i* (i.e., disposed within the anode or second electrode 120), it is strongly activated by the electric field, which causes electron excitation, ionization, and imparts vibrational and rotational energy, as well as disassociation of the gas. As described above, a short residence time within the electric field results in a lower temperature of the plasma output. A flow of gas with a long residence time insider the electric field results in a higher temperature attributable to the efficient exchange of atoms and molecules during the residency. The jet or flow forces the gas perpendicular to electrodes 120 and 110, out the microhollow gas passage 119 and out of the electric field. As the gas flows away from the MHCD, there is relaxation, recombination, and diffusion.

The selectivity of the generated radical may be controlled by the residence time of the gas inside the electric field and the characteristics of the applied field. For example, by choice of gas and superimposing a high voltage pulse of controlled duration and field strength, the present invention may be tuned to produce plasma having desired radical species, for applications such as chemical processing, etc.

In general, two flow mechanisms operate to reduce energy as the discharge diffuses into the surrounding environment. At atmospheric pressure in air, the collisions between electrons and heavier gas particles can cause an electron to lose up to 99.9% of its energy. (C. O. Laux, et al., $30^{th}$ AIAA Plasmadynamic and Laser Congress (1999)). In these collisions, electrons transfer their vibrational energy to nitrogen molecules, which then dissipate the energy in vibrational relaxation by a translation mode. A second mechanism is the mixing by diffusion of plasma after exiting the gas passage, which becomes more pronounced in turbulent flow. A laminar flow exiting the passage will initially enter a transitional phase in which eddies of the surrounding, cold gases are entrained into the plasma jet, but with incomplete or limited mixing. A second phase is a departure from laminar flow as mixing of the eddies increases; ultimately, the eddies of colder gases break down, mixing with the discharge extensively and diffusing the energy of the jet.

Thus, in both laminar and turbulent flow for the present invention, gas temperature is a controllable function of flow rate, structure of the microhollow gas passage, and current or the electric field. The microhollow cathode discharge generates a micro plasma jet at atmospheric pressure having a controllable temperature: an increase in flow rate reduces gas temperature while an increase in current increases gas temperature. This stable micro plasma jet described herein displayed a power consumption that varied between 1-10 W, with temperature measurements between 300 K and 1000 K, as a function of gas flow rate and discharge current.

SUMMARY

In summary, the present invention is a microhollow cathode discharge assembly. In the illustrative embodiment, the assembly in planar form comprised a planar anode sheet; a planar cathode sheet, and a dielectric between the anode and cathode. Disposed through these sheets or layers is a microhollow gas passage; preferably, this gas passage is tapered such that the diameter at the anode is smaller than that at the cathode. When a potential is placed across the electrodes, and gas flows through the gas passage in the direction from the anode to the cathode (i.e., in the illustrated example, in the direction of the taper), a low temperature micro plasma jet can be created at atmospheric pressure.

Plasma at atmospheric pressure may have a wide range of applications, including surface treatment, medical treatment, cleaning, or purification. Selectivity of the plasma for a particular use can be controlled in part by tuning the gas temperature, the potential, and the nature of the operating gas. In addition, the generated radical species can be influenced by the choice of gas, in that some gases generate certain radical species more efficiently or effectively than others. Radical species may also be affected by the residence time of the gas inside the electric field within the microhollow and the applied field. The electric field may be pulsed or varied in duration and field strength for desired characteristics radical species. That is, the energy, radical species, and temperature may be chosen for specific application of plasma—such as plasma interaction with cancer or tumor cells.

Additionally, the jet may be combined with other such jets to form arrays to increase the scale of the applications for generating stable large volume, low temperature, atmospheric pressure air plasmas.

This contemplated arrangement may be achieved in a variety of configurations. While there has been described what are believed to be the preferred embodiment of the present invention, those skilled in the art will recognize that other and further changes and modifications may be made thereto without departing from the spirit of the invention, and it is intended to claim all such changes and modifications as fall within the true scope of the invention.

What is claimed is:

1. A device for the creation of a high pressure plasma jet, comprising:

a first electrode;

a second electrode, spaced from the first electrode;

at least one microhollow formed through the first electrode and the second electrode;

a circuit for creating an electrical potential between the first electrode and the second electrode, such that the first electrode is a cathode and the second electrode is an anode, at a voltage and current for producing microhollow discharges in each of the at least one microhollow formed through the first electrode and the second electrode, wherein the microhollow is tapered such that the area of the microhollow disposed in the second electrode is larger than the area of the microhollow disposed in the first electrode; and a gas supply for supplying gas into each of the at least one microhollow at the second electrode so as to create a plasma jet exiting the at least one microhollow at the first electrode.

2. The device for the creation of a high pressure plasma jet according to claim 1, wherein the first electrode is separated from the second electrode by a dielectric including at least one microhollow formed through the dielectric similarly to the at least one microhollow through the first electrode and the second electrode.

3. The device for the creation of a high pressure plasma jet according to claim 1, wherein the first electrode and the second electrode are plane-parallel.

* * * * *